May 30, 1933.   W. SCHWAB   1,912,313

VISE

Filed May 3, 1932

WITNESSES

INVENTOR
William Schwab
BY
ATTORNEYS

Patented May 30, 1933

1,912,313

UNITED STATES PATENT OFFICE

WILLIAM SCHWAB, OF BROOKLYN, NEW YORK

VISE

Application filed May 3, 1932. Serial No. 609,012.

An object of the invention is to provide a vise with jaws having ledges for supporting a member which is to be gripped by the jaws. The jaws are each provided with a ledge and a recess for receiving the ledge on the companion jaw respectively, which permits the jaws to close with each ledge disposed in the recess in the companion jaw. This construction permits the opening of the jaws to positions where the ledge on each jaw will be spaced from the companion jaw, it being possible to support one side of a member to be gripped on the ledge on one of the jaws and the other side of the member on the ledge on the other jaw, the construction being such that the ledges need not extend a great distance from the faces of the jaws.

Another object of the invention is to provide the jaws with transverse openings to provide a convenient means to saw at the transverse openings a member gripped by the jaws, the transverse openings also serving to receive a projection on a member which is gripped by the jaws.

Additional objects of the invention will appear in the following specification in which the preferred form of the invention is described.

Figure 1:
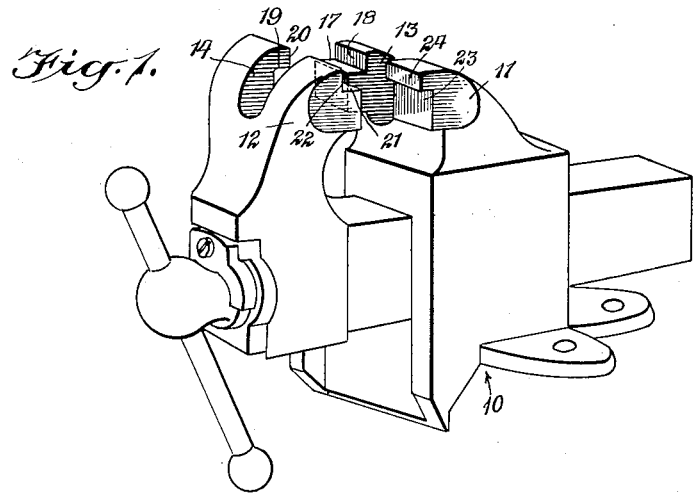
Figure 2:
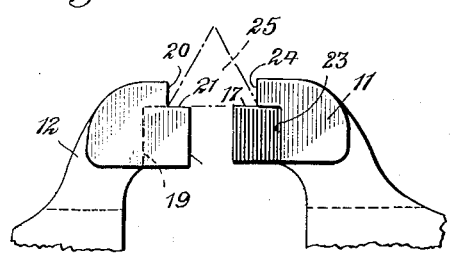
Figure 3:
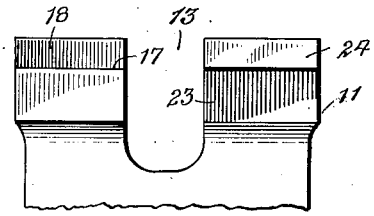
Figure 4:
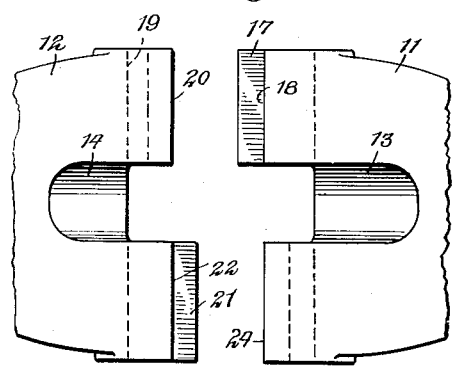
Figure 5:
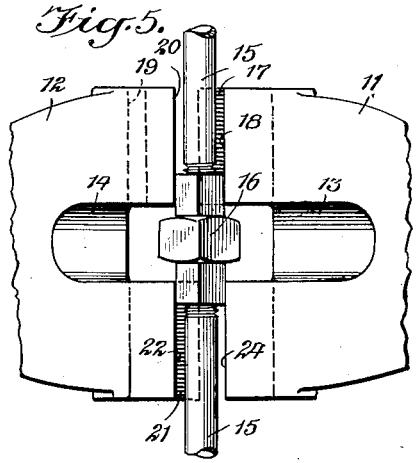

In the drawing similar reference characters refer to similar parts in all the views, of which Figure 1 is a perspective view of a vise provided with the jaws which are the subject matter of this application, Figure 2 is a fragmentary side elevation showing the jaws, Figure 3 is a side view of Figure 2, Figure 4 is a plan view of Figure 2, and Figure 5 is a plan view similar to the plan view shown in Figure 4, but illustrating a member supported on the ledges extending from the jaws and having a projection disposed in the transverse openings in the jaws.

By referring to the drawing, it will be seen that the vise 10 has jaws 11 and 12, there being a transverse opening 13 in the jaw 11 and there being a similar transverse opening 14 in the jaw 12, the transverse openings 13 and 14 serving to permit the convenient sawing of a pipe or member gripped by the jaws, with the saw extending through the transverse openings 13 and 14. The transverse openings 13 and 14 are also of importance in gripping pipes or members between the jaws 11 and 12, for, when pipes or members 15 have a coupling 16 or other projection, it may be disposed in the openings 13 and 14, while portions of the coupling 16, or, in certain cases, the pipes 15 or other members, may be gripped between the jaws.

As will be seen by referring to the drawing, the jaw 11 has a ledge 17 disposed at one side of its opening 13 and at one side of the vise, the ledge 17 extending from the inner face 18 of the jaw 11. The other jaw 12 has a recess 19 at its inner face 20 for receiving the ledge 17, so that the ledge 17 may be received in the recess 19 and the inner face 18 of the jaw 11 may abut against the inner face 20 of the jaw 12. At the other side of the vise, the jaw 12 has a ledge 21 which is disposed at one side of its transverse opening 14, the ledge 21 extending from its inner face 22 and being adapted to be received in a recess 23 in the inner face 24 of the jaw 11. It will be seen that the ledges 17 and 21 are disposed below the inner faces 18 and 22 of the jaws 11 and 12, and that the recesses 19 and 23 are also disposed below the inner faces 20 and 24 of the jaws 11 and 12. It will be understood that the inner face 24 of the jaw 11 may abut against the inner face 22 of the jaw 12 and that the inner face 20 of the jaw 12 may abut against the inner face 18 of the jaw 11.

These ledges 17 and 21 serve to support a member which is to be gripped between the inner faces of the jaws 11 and 12, while, if the member, which is to be gripped between the said inner faces of the jaws, has a projection, this projection may extend through the transverse openings 13 and 14.

When a pipe is to be gripped between the inner faces of the jaws 11 and 12, the pipe is not only gripped by the jaws, but the ledges 17 and 21 serve to hold the pipe and prevent one end of the pipe from moving upwardly when the pipe, or member connected therewith, is being operated on.

It will also be seen that, when a member 25, which is triangular in cross section, is to be gripped by the vise, this may be conveniently done by resting one face of the member 25 on the ledges 17 and 21 and closing the jaws 11 and 12 in the customary manner. The jaws 11 and 12 are supported in the customary manner and are operated in accordance with the usual practice, as will be readily understood.

What is claimed is:

1. In a vise having two jaws, a ledge disposed wholly at one side of the vise and fixed to and extending from the inner faces of one of the jaws, a ledge disposed wholly at the other side of the vice and fixed to and extending from the inner face of the other jaw, the ledges being disposed below the upper inner faces of the jaws respectively, each of the jaws having a recess for receiving the ledge on the companion jaw.

2. In a vise having two jaws, a ledge disposed wholly at one side of the vise and extending from the inner faces of one of the jaws, a ledge disposed wholly at the other side of the vise and extending from the inner face of the other jaw, the ledges being disposed below the upper inner faces of the jaws respectively, each of the jaws having a recess for receiving the ledge on the companion jaw, one of the jaws having a transverse opening extending through the inner face of the jaw.

3. In a vise having two jaws, a ledge extending from the bottom of the inner face of one of the jaws for supporting a member to be gripped by the jaws, each of the jaws having a transverse opening, the transverse openings extending through the inner and outer faces of the jaws and being approximately in alignment.

4. In a vise having two jaws, two ledges, one extending from the bottom of the inner face of each of the jaws, each of the jaws having a transverse opening, the transverse openings extending through the inner and outer faces of the jaws and being approximately in alignment.

5. In a vise having two jaws, there being a recess in the inner face of the bottom of one of the jaws and a ledge extending from the bottom of the inner face of the other jaw for disposal in the recess, each of the jaws having a transverse opening, the transverse openings extending through the inner and outer faces of the jaws and being approximately in alignment.

6. In a vise having two jaws, each of the jaws having a transverse opening, the transverse openings extending through the inner and outer faces of the jaws, one of the jaws having a ledge extending from the bottom of the inner face of the jaw at one side of the transverse openings, and the other jaw having a ledge extending from the bottom of the inner face of the other jaw at the other side of the transverse openings.

7. In a vise having two jaws, each of the jaws having a transverse opening, the transverse openings extending through the inner and outer faces of the jaws, one of the jaws having a ledge extending from the bottom of the inner face of the jaw at one side of the transverse openings, and the other jaw having a ledge extending from the bottom of the inner face of the other jaw at the other side of the transverse openings, there being recesses in the inner faces of the jaws for receiving the ledges respectively.

8. In a vise having two jaws, a ledge fixed to and extending from below the top of the inner face of one of the jaws at one side of the vise, and a ledge fixed to and extending from below the top of the inner face of the other jaw at the other side of the vise.

9. In a vise having two jaws, each with a recess below the top of its inner face, the recesses being disposed laterally relatively to each other, and two ledges fixed one to each jaw and extending from below the top of the inner face of each of the jaws, the ledge on each jaw being in alignment with the recess on the other jaw to permit of the disposal of the ledges in the recesses in the companion jaws respectively.

WILLIAM SCHWAB.